(12) United States Patent
Lee

(10) Patent No.: US 12,468,547 B2
(45) Date of Patent: Nov. 11, 2025

(54) COMPUTER AND METHOD OF BOOTING COMPUTER

(71) Applicant: MITAC COMPUTING TECHNOLOGY CORPORATION, Taoyuan (TW)

(72) Inventor: Hsin-I Lee, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 94 days.

(21) Appl. No.: 18/491,325

(22) Filed: Oct. 20, 2023

(65) Prior Publication Data

US 2024/0134652 A1 Apr. 25, 2024
US 2024/0231835 A9 Jul. 11, 2024

(30) Foreign Application Priority Data

Oct. 24, 2022 (TW) .................................. 111140207

(51) Int. Cl.
G06F 9/4401 (2018.01)
(52) U.S. Cl.
CPC .................................. G06F 9/441 (2013.01)
(58) Field of Classification Search
CPC ....... G06F 9/441; G06F 9/4408; G06F 9/4411
See application file for complete search history.

(56) References Cited

U.S. PATENT DOCUMENTS

| | | | |
|---|---|---|---|
| 2007/0043888 A1* | 2/2007 | Suzuki | G06F 3/0611 710/62 |
| 2007/0043889 A1* | 2/2007 | Sanada | G06F 13/102 710/62 |
| 2010/0205598 A1* | 8/2010 | Shao | G06F 9/441 717/174 |
| 2013/0339718 A1* | 12/2013 | Kanaya | G06F 11/1417 713/2 |
| 2021/0004242 A1* | 1/2021 | Su | G06F 9/4416 |
| 2022/0179806 A1* | 6/2022 | Hilland | G06F 13/20 |
| 2022/0308963 A1* | 9/2022 | Pathan | G06F 11/1469 |

FOREIGN PATENT DOCUMENTS

CN  109656627 A  *  4/2019  ......... G06F 9/44505

* cited by examiner

*Primary Examiner* — Hyun Soo Kim
(74) *Attorney, Agent, or Firm* — Michael Best & Friedrich LLP

(57) ABSTRACT

A method of booting a computer is provided. The computer includes a processing unit, and a baseboard controlling unit storing a prioritized option of boot device and a prioritized type of boot hard disk. The method includes steps of: the processing unit sending a first query about the prioritized option of boot device to the baseboard controlling unit; in response to receiving the prioritized option of boot device from the baseboard controlling unit, when the processing unit determines that the prioritized option of boot device is hard disk, the processing unit sending a second query about the prioritized type of boot hard disk to the baseboard controlling unit; and in response to receiving the prioritized type of boot hard disk from the baseboard controlling unit, the processing unit booting the computer from a hard disk that corresponds to the prioritized type of boot hard disk.

14 Claims, 3 Drawing Sheets

COMPUTER AND METHOD OF BOOTING COMPUTER

CROSS-REFERENCE TO RELATED APPLICATION

This application claims priority to Taiwanese Invention Patent Application No. 111140207, filed on Oct. 24, 2022.

FIELD

The disclosure relates to a computer and a method of booting a computer.

BACKGROUND

With a conventional basic input/output system (BIOS), after a user enters a BIOS setup menu of the conventional BIOS, the user may set the boot order by selecting one option of boot device for booting a computer among multiple options of boot device, and the options of boot device may include a compact disc read-only-memory (CD-ROM), a hard disk drive (HDD), a solid-state drive (SSD), flash memory, etc. However, the computer requires rebooting once the boot order of the computer is set, which is time consuming.

Another conventional method of setting the boot order is through a set system boot options command of an intelligent platform management interface (IPMI), which does not require rebooting of the computer.

However, there are different types of HDDs/SSDs connected with different standard interfaces, such as serial advanced technology attachment (SATA) HDD, peripheral component interconnect express (PCIe) SSD, non-volatile memory express (NVMe) SSD, direct current persistent memory module (DCPMM) HDD, etc. The IPMI command can only select the option of boot device as HDD/SSD, but cannot select a specific type of HDD/SSD for booting. For example, when the computer has both the SATA HDD and the DCPMM HDD and it is desirable to use the DCPMM HDD for rebooting, the IPMI command can only select HDD for booting but is unable to set the DCPMM HDD as the highest priority. The reason is that the IPMI command can set HDD as the highest priority in the boot order but is unable to set the DCPMM HDD as the highest priority. As a result, the user may only check whether the current boot device is DCPMM HDD or not after the computer is rebooted. If the current booting HDD is not the desired type (i.e., the SATA HDD is used for booting instead), without knowing which HDD is the desired type, the user would need to enter the BIOS setup menu and re-set the priority of boot slots, and then reboot again, until the desired booting type of HDD is booted.

SUMMARY

Therefore, an object of the disclosure is to provide a method of booting a computer that can alleviate at least one of the drawbacks of the prior art.

According to the disclosure, a method of booting a computer is provided. The computer includes a baseboard controlling unit, a storage medium, and a processing unit electrically connected to the baseboard controlling unit and the storage medium. The storage medium stores program codes of a basic input/output system (BIOS). The baseboard controlling unit stores a prioritized option of boot device and a prioritized type of boot hard disk. The processing unit executes the BIOS for executing a plurality of firmware steps defined in the program codes. The method includes steps, during a power-on self-test, of: the processing unit sending a first query about the prioritized option of boot device to the baseboard controlling unit; in response to receipt of device information related to the prioritized option of boot device from the baseboard controlling unit, the processing unit determining whether the prioritized option of boot device is hard disk based on the device information; when the processing unit determines that the prioritized option of boot device is hard disk, the processing unit sending a second query about the prioritized type of boot hard disk to the baseboard controlling unit; and in response to receipt of hard disk information related to the prioritized type of boot hard disk from the baseboard controlling unit, the processing unit booting the computer from a hard disk that corresponds to the prioritized type of boot hard disk.

According to the disclosure, a computer includes a baseboard controlling unit, a storage medium, and a processing unit. The baseboard controlling unit is configured to store a prioritized option of boot device and a prioritized type of boot hard disk. The storage medium is configured to store program codes of a basic input/output system (BIOS). The processing unit is electrically connected to the baseboard controlling unit and the storage medium, and is configured to execute the BIOS for executing a plurality of firmware steps defined in the program codes, and to, during a power-on self-test, send a first query about the prioritized option of boot device to the baseboard controlling unit, and in response to receipt of device information related to the prioritized option of boot device from the baseboard controlling unit, determine whether the prioritized option of boot device is hard disk based on the device information. When the processing unit determines that the prioritized option of boot device is hard disk, the processing unit is further configured to send a second query about the prioritized type of boot hard disk to the baseboard controlling unit, and in response to receipt of hard disk information related to the prioritized type of boot hard disk from the baseboard controlling unit, boot the computer from a hard disk that corresponds to the prioritized type of boot hard disk.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
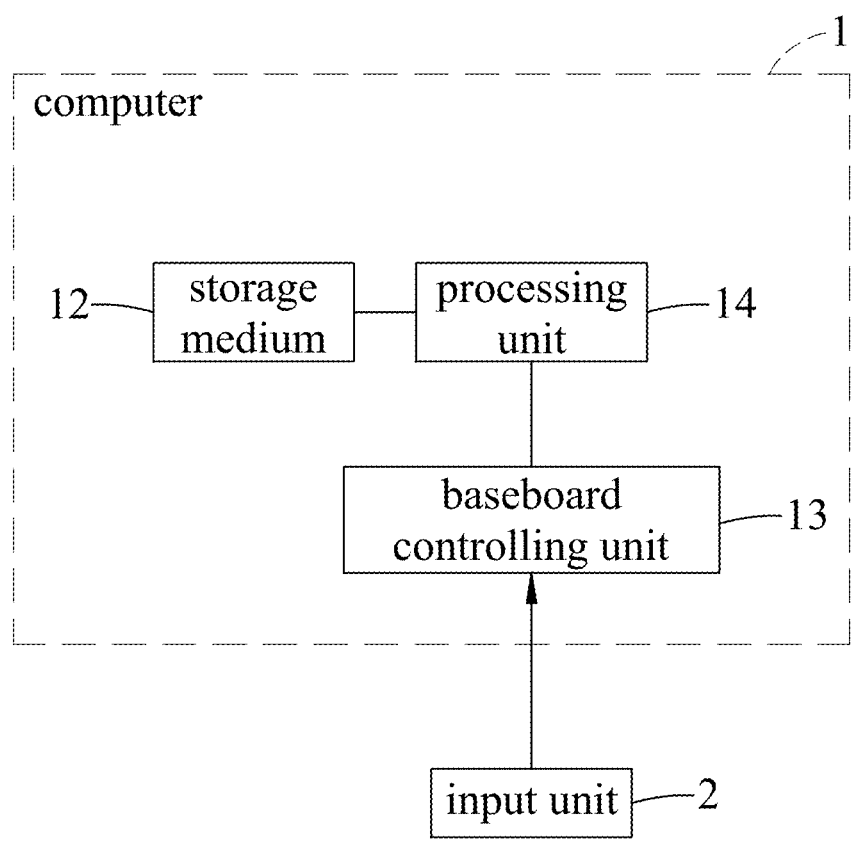
FIG. 1 is a block diagram illustrating a computer according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer 1 according to an embodiment of the disclosure is illustrated. The computer 1 includes a storage medium 12, a baseboard controlling unit 13, and a processing unit 14 electrically connected to the storage medium 12 and the baseboard controlling unit 13.

The computer 1 may be, but is not limited to, a personal computer, a laptop, a server or other devices that include a basic input/output system (BIOS). The storage medium 12 may be flash memory that stores program codes of the BIOS.

The baseboard controlling unit 13 is, for example, a baseboard management controller (BMC) that is electrically connected to an input unit 2, and stores a prioritized option of boot device and a prioritized type of boot hard disk. The input unit 2 may be an intelligent platform management interface (IPMI) message handler. In this embodiment, the input unit 2 is electrically connected to the baseboard controlling unit 13 via a local area network (LAN) port. The prioritized option of boot device may be one of various types of boot devices (including hard disk, compact disc read-only-memory (CD-ROM), and network interface card) that is set to have the highest priority in a boot order. The prioritized type of boot hard disk may be one of various types of hard disks (including serial advanced technology attachment (SATA) hard disk, peripheral component interconnect express (PCIe) hard disk, direct current persistent memory module (DCPMM) hard disk, non-volatile memory express (NVMe) hard disk, and universal serial bus (USB) hard disk) that is set to have the highest priority in the boot order. It should be noted that, throughout this disclosure, the term "hard disk" may refer to a hard disk drive, a solid-state drive, or the like.

The processing unit 14 may be, but is not limited to, a system on a chip (SoC), or may be implemented by a central processing unit (CPU) coupled to a platform controller hub (PCH).

Figure 2:
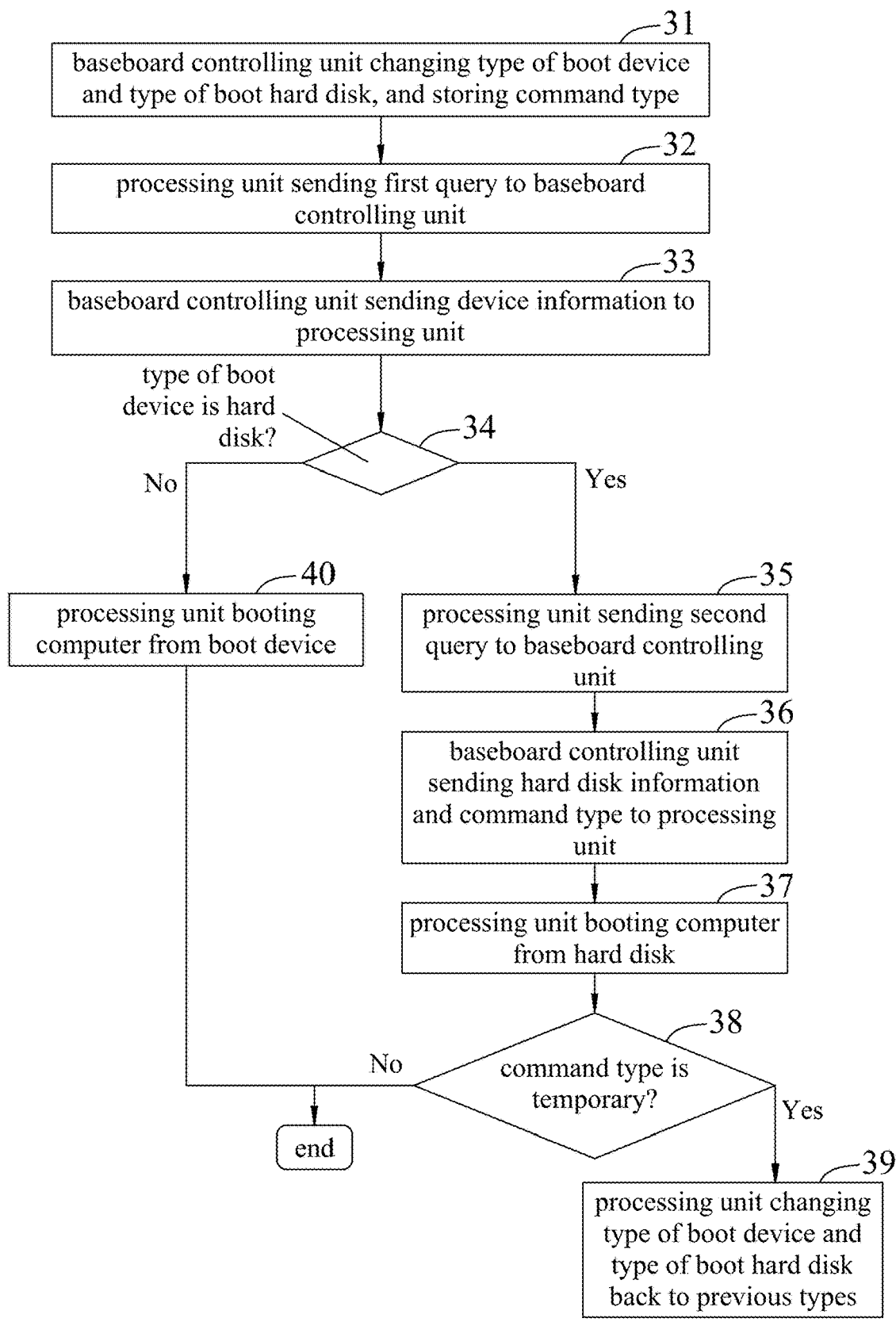
FIG. 2 is a flow chart of a method of booting a computer according to an embodiment of the disclosure.

Further referring to FIG. 2, a method of booting a computer according to an embodiment of the disclosure is implemented by the computer 1 of FIG. 1. The method includes steps 31-40.

In step 31, in response to receiving, from the input unit 2, a first command for setting "hard disk" as the prioritized option of boot device, a second command for setting a specific type of hard disk (i.e., SATA, PCIe, DCPMM, NVMe or USB) as the prioritized type of boot hard disk, and a third command for setting a command type for both the first command and the second command, the baseboard controlling unit 13 changes the prioritized option of boot device and the prioritized type of boot hard disk respectively based on the first command and the second command, and stores the command type based on the third command. The command type is either temporary or permanent.

It should be noted that, in this embodiment, when the computer 1 is plugged in (i.e., electrically connected to a power source), the baseboard controlling unit 13 may, but not limited to, receive the first command, the second command and the third command after the baseboard controlling unit 13 is initialized and before the computer 1 is powered on.

In step 32, the processing unit 14 executes the BIOS to send a first query about the prioritized option of boot device to the baseboard controlling unit 13.

It should be noted that, the first command, the second command and the third command may be BMC commands, and the first query may be an original equipment manufacturer (OEM) command.

In step 33, the baseboard controlling unit 13 sends device information related to the prioritized option of boot device to the processing unit 14 in response to receipt of the first query.

In response to receipt of the device information, the processing unit 14 determines whether the prioritized option of boot device is "hard disk" based on the device information (step 34). When the processing unit 14 determines that the prioritized option of boot device is "hard disk," the flow proceeds to step 35; otherwise, the step proceeds to step 40.

It should be noted that, in this embodiment, different types of boot device (i.e., hard disk, CD-ROM, and network interface card) correspond to different flags, respectively. In step 33, the baseboard controlling unit 13 returns a flag value of one of the flags that corresponds to the prioritized option of boot device stored therein as the device information to the processing unit 14 in response to receipt of the first query. In step 34, the processing unit 14 determines whether the flag value received from the baseboard controlling unit 13 corresponds to a device type of "hard disk." The embodiment is not limited to the abovementioned example. For example, when the flag that corresponds to the device type of "hard disk" has a flag value of "0," the processing unit 14 determines that the prioritized option of boot device is "hard disk" and the flow proceeds to step 35; when any flag corresponding to a type of boot device that is not "hard disk" has a flag value of "0," the processing unit 14 determines that the prioritized option of boot device is not "hard disk" and the flow proceeds to step 40.

In step 35, the processing unit 14 sends a second query about the prioritized type of boot hard disk to the baseboard controlling unit 13.

In step 36, the baseboard controlling unit 13 sends, in response to receipt of the second query, hard disk information that is related to the prioritized type of boot hard disk and the command type that is based on the third command to the processing unit 14. In response to receipt of the hard disk information from the baseboard controlling unit 13, the processing unit 14, in step 37, determines the prioritized type of boot hard disk based on the hard disk information and boots the computer 1 from a hard disk that corresponds to the prioritized type of boot hard disk. In this embodiment, the hard disk information is inputted into the baseboard controlling unit 13 by a user through the input unit 2, and the hard disk information is then sent to the processing unit 14 by the baseboard controlling unit 13. For example, the hard disk information may be in the form of a table, a command, a symbol or a text, and this disclosure is not limited thereto.

Figure 3:
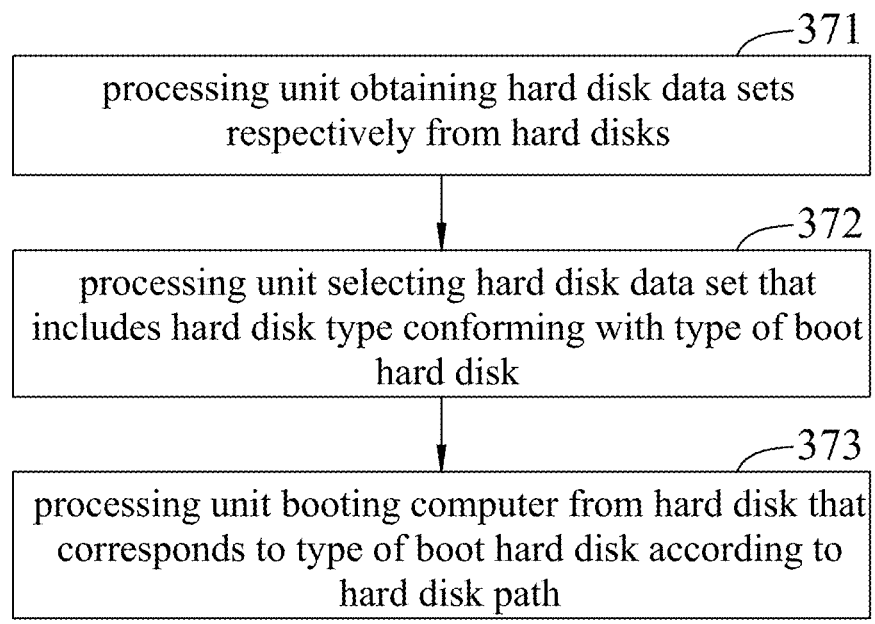
FIG. 3 is a flow chart illustrating sub-steps of a step, as shown in FIG. 2, of the processing unit booting the computer from a hard disk that corresponds to a prioritized type of boot hard disk.

Further referring to FIG. 3, step 37 includes sub-steps 371-373. In sub-step 371, the processing unit 14 scans through a plurality of hard disks (not shown) that are bootable so as to obtain a plurality of hard disk paths respectively of the hard disks. For each of the hard disks, the hard disk path includes information related to a hard disk type and a device path of the hard disk, and the device path is used to boot the computer 1 from the hard disk.

It should be noted that, in this embodiment, the processing unit 14 executes a sub-program of the BIOS to obtain the hard disk paths respectively from the hard disks that are bootable according to a device path protocol defined by Unified Extensible Firmware Interface Specifications (UEFI Spec). The hard disk path may be a file path under the UEFI Spec. The embodiment is not limited to the abovementioned example.

In sub-step 372, the processing unit 14 obtains, for each of the hard disks, the hard disk type of the hard disk based on the information included in the hard disk path of the hard disk according to a device path protocol defined by the UEFI Spec, and selects one of the hard disk paths that includes the hard disk type conforming with the prioritized type of boot hard disk. For example, the hard disk path (i.e., the file path) may include a string of hexadecimal codes (e.g., 0x17), and the processing unit 14 may convert the string of hexadecimal codes into a string of decimal codes (e.g., 23) and obtain the hard disk type from a lookup table with reference to the string of decimal codes. For example, the string of decimal codes "23" indicates the hard disk type of NVMe hard disk in the lookup table.

In sub-step 373, for said one of the hard disk paths selected in sub-step 372, the processing unit 14 obtains the device path of the hard disk based on the information included in said one of the hard disk paths according to the device path protocol defined by the UEFI Spec, and then boots the computer 1 from one of the hard disks according to the device path thus obtained.

In step 38, the processing unit 14 determines whether the command type is temporary. When the processing unit 14 determines that the command type is temporary, the flow proceeds to step 39; otherwise, the processing unit 14 terminates a flow of the method (i.e., the flow of the method of booting the computer 1 is terminated).

In some embodiments, the baseboard controlling unit 13 does not send the command type to the processing unit 14 in step 36, and the flow of the method is terminated after step 37 (i.e., steps 38 and 39 are omitted). The embodiment is not limited to the abovementioned example.

In step 39, the processing unit 14 changes both the prioritized option of boot device and the prioritized type of boot hard disk back to the types before being changed in step 31.

It should be noted that, when the processing unit 14 determines that the command type is temporary, it means that the settings based on the first command and the second command can only be applied once, thus the prioritized option of boot device and the prioritized type of boot hard disk that were set based respectively on the first command and the second command in step 31 need to be changed back.

When the processing unit 14 determines that the prioritized option of boot device is not "hard disk" in step 34, in step 40, the processing unit 14 boots the computer 1 from a boot device that corresponds to the prioritized option of boot device.

It should be noted that, steps 32, 34, 35 and 37-40 executed by the processing unit 14 are part of a power-on self-test of the BIOS. That is to say, the processing unit 14 executes the program codes of the BIOS stored in the storage medium 12 for implementing a plurality of firmware steps defined in the program codes during the power-on self-test so as to implement steps 32, 34, 35 and 37-40 of the method.

In summary, according to the disclosure, the baseboard controlling unit 13 changes the prioritized option of boot device and the prioritized type of boot hard disk based respectively on the first command and the second command, stores the command type based on the third command. When determining that the prioritized option of boot device is "hard disk," the processing unit 14 sends the second query to the baseboard controlling unit 13 for the baseboard controlling unit 13 to return the hard disk information related to the specific type of hard disk. Therefore, the processing unit 14 may directly boot the computer 1 from a hard disk that corresponds to the specific type of hard disk without the need for a user to repeatedly enter a BIOS setup menu to set a boot slot for booting the computer 1.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of booting a computer including a baseboard controlling unit, a storage medium, and a processing unit electrically connected to the baseboard controlling unit and the storage medium, the storage medium storing program codes of a basic input/output system (BIOS), the baseboard controlling unit storing a prioritized option of boot device and a prioritized type of boot hard disk, the processing unit executing the BIOS for executing a plurality of firmware steps defined in the program codes, the method comprising steps, during a power-on self-test, of:
   the processing unit sending a first query about the prioritized option of boot device to the baseboard controlling unit;
   in response to receipt of device information related to the prioritized option of boot device from the baseboard controlling unit, the processing unit determining whether the prioritized option of boot device is hard disk based on the device information;
   when the processing unit determines that the prioritized option of boot device is hard disk, the processing unit sending a second query about the prioritized type of boot hard disk to the baseboard controlling unit; and
   in response to receipt of hard disk information related to the prioritized type of boot hard disk from the baseboard controlling unit, the processing unit booting the computer from a hard disk that corresponds to the prioritized type of boot hard disk;
   wherein the step of the processing unit booting the computer from the hard disk that corresponds to the prioritized type of boot hard disk includes sub-steps of
   the processing unit scanning through a plurality of hard disks that are bootable so as to obtain a plurality of hard disk paths respectively of the hard disks, where for each of the hard disks, the hard disk path includes information related to a hard disk type and a device path of the hard disk, the processing unit obtaining, for each of the hard disks, the hard disk type of the hard disk based on the information included in the hard disk path of the hard disk, and selecting one of the hard disk paths that includes the hard disk type conforming with the prioritized type of boot hard disk, and the processing unit obtaining the device path of the hard disk based on the information included in said one of the hard disk paths, and then booting the computer from one of the hard disks according to the device path thus obtained;

wherein the processing unit executes a sub-program of the BIOS to obtain the hard disk paths respectively from the hard disks that are bootable according to a device path protocol defined by Unified Extensible Firmware Interface Specifications (UEFI Spec).

2. The method as claimed in claim 1, further comprising a step of:

the baseboard controlling unit returning a flag value that corresponds to the prioritized option of boot device as the device information to the processing unit in response to receipt of the first query, wherein the step of the processing unit determining whether the prioritized option of boot device is hard disk is to determine whether the flag value corresponds to a device type of a hard disk.

3. The method as claimed in claim 1, further comprising a step of, when the processing unit determines that the prioritized option of boot device is not hard disk, the processing unit booting the computer from a boot device that corresponds to the prioritized option of boot device.

4. The method as claimed in claim 1, the baseboard controlling unit being electrically connected to an input unit, the method further comprising, before the step of the processing unit sending the first query to the baseboard controlling unit, a step of:

in response to receiving, from the input unit, a first command for setting hard disk as the prioritized option of boot device, and a second command for setting a specific type of hard disk as the prioritized type of boot hard disk, the baseboard controlling unit changing the prioritized option of boot device and the prioritized type of boot hard disk respectively based on the first command and the second command.

5. The method as claimed in claim 4, further comprising a step of:

in response to receiving, from the input unit, a third command for setting a command type for both the first command and the second command, the baseboard controlling unit storing the command type, where the command type is either temporary or permanent.

6. The method as claimed in claim 5, further comprising steps of:

in response to receipt of the second query, the baseboard controlling unit returning the hard disk information and the command type to the processing unit;

the processing unit determining whether the command type is temporary; and when the processing unit determines that the command type is temporary, the processing unit, after implementing the step of booting the computer, changing both the prioritized option of boot device and the prioritized type of boot hard disk back to the types before being changed in the step of the baseboard controlling unit changing the prioritized option of boot device and the prioritized type of boot hard disk.

7. The method as claimed in claim 6, further comprising a step of, when the processing unit determines that the command type is permanent, terminating the method after implementing the step of booting the computer.

8. A computer comprising:

a baseboard controlling unit configured to store a prioritized option of boot device and a prioritized type of boot hard disk;

a storage medium configured to store program codes of a basic input/output system (BIOS); and a processing unit electrically connected to said baseboard controlling unit and said storage medium, said processing unit being configured to execute the BIOS for executing a plurality of firmware steps defined in the program codes, and to, during a power-on self-test, send a first query about the prioritized option of boot device to said baseboard controlling unit, in response to receipt of device information related to the prioritized option of boot device from said baseboard controlling unit, determine whether the prioritized option of boot device is hard disk based on the device information, when determining that the prioritized option of boot device is a hard disk, send a second query about the prioritized type of boot hard disk to said baseboard controlling unit, and in response to receipt of hard disk information related to the prioritized type of boot hard disk from said baseboard controlling unit, boot said computer from a hard disk that corresponds to the prioritized type of boot hard disk;

wherein said processing unit is configured to boot said computer from the hard disk that corresponds to the prioritized type of boot hard disk by scanning through a plurality of hard disks that are bootable so as to obtain a plurality of hard disk paths respectively of the hard disks, where for each of the hard disks, the hard disk path includes information related to a hard disk type and a device path of the hard disk, obtaining, for each of the hard disks, the hard disk type of the hard disk based on the information included in the hard disk path of the hard disk, and selecting one of the hard disk paths that includes the hard disk type conforming with the prioritized type of boot hard disk, and obtaining the device path of the hard disk based on the information included in said one of the hard disk paths, and then booting said computer from one of the hard disks according to the device path thus obtained;

wherein said processing unit is configured to execute a sub-program of the BIOS to obtain the hard disk paths respectively from the hard disks that are bootable according to a device path protocol defined by Unified Extensible Firmware Interface Specifications (UEFI Spec).

9. The computer as claimed in claim 8, wherein said baseboard controlling unit is further configured to return a flag value that corresponds to the prioritized option of boot device as the device information to said processing unit in response to receipt of the first query.

10. The computer as claimed in claim 9, wherein said processing unit is configured to determine whether the prioritized option of boot device is hard disk by determining whether the flag value corresponds to a device type of hard disk.

11. The computer as claimed in claim 8, wherein said processing unit is further configured to, when determining that the prioritized option of boot device is not hard disk, boot said computer from a boot device that corresponds to the prioritized option of boot device.

12. The computer as claimed in claim 8, wherein said baseboard controlling unit is configured to be electrically connected to an input unit, and said baseboard controlling unit is further configured to:
   in response to receiving, from the input unit, a first command for setting hard disk as the prioritized option of boot device, and a second command for setting a specific type of hard disk as the prioritized type of boot hard disk, change the prioritized option of boot device and the prioritized type of boot hard disk respectively based on the first command and the second command.

13. The computer as claimed in claim 12, wherein said baseboard controlling unit is further configured to
   in response to receiving, from the input unit, a third command for setting a command type for both the first command and the second command, store the command type, where the command type is either temporary or permanent.

14. The computer as claimed in claim 13, wherein said baseboard controlling unit is further configured to, in response to receipt of the second query, return the hard disk information and the command type to said processing unit, and said processing unit is further configured to:
   determine whether the command type is temporary; and
   when it is determined that the command type is temporary, after booting said computer, change both the prioritized option of boot device and the prioritized type of boot hard disk back to the types before being changed by said baseboard controlling unit.

\* \* \* \* \*